US006680108B1

(12) United States Patent
Majumdar et al.

(10) Patent No.: US 6,680,108 B1
(45) **Date of Patent: *Jan. 20, 2004**

(54) IMAGE LAYER COMPRISING INTERCALATED CLAY PARTICLES

(75) Inventors: Debasis Majumdar, Rochester, NY (US); Dwight W. Schwark, Greenville, SC (US); Robert J. Kress, Rochester, NY (US); Thomas N. Blanton, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 09/617,152

(22) Filed: Jul. 17, 2000

(51) Int. Cl.[7] ........................ B32B 19/00; B32B 19/02; C08J 9/16

(52) U.S. Cl. .................... 428/323; 428/332; 428/537.5; 524/445; 524/446

(58) Field of Search ............................ 428/332, 304.4, 428/537.5, 323; 524/445, 446

(56) References Cited

U.S. PATENT DOCUMENTS

| | | | | |
|---|---|---|---|---|
| 4,503,111 A | | 3/1985 | Jaeger et al. | |
| 4,555,437 A | | 11/1985 | Tanck | |
| 4,578,285 A | | 3/1986 | Viola | |
| 4,741,969 A | | 5/1988 | Hayama et al. | |
| 4,753,908 A | | 6/1988 | Kawase et al. | |
| 5,045,864 A | | 9/1991 | Light | |
| 5,084,338 A | | 1/1992 | Light | |
| 5,126,193 A | | 6/1992 | Light | |
| 5,126,194 A | | 6/1992 | Light | |
| 5,126,195 A | | 6/1992 | Light | |
| 5,139,867 A | | 8/1992 | Light | |
| 5,147,717 A | | 9/1992 | Light | |
| 5,171,626 A | | 12/1992 | Nagamine et al. | |
| 5,543,453 A | | 8/1996 | Ito et al. | |
| 5,552,469 A | * | 9/1996 | Beall et al. | 524/445 |
| 5,554,670 A | | 9/1996 | Giannells et al. | |
| 5,560,996 A | | 10/1996 | Ito et al. | |
| 5,576,088 A | | 11/1996 | Ogawa et al. | |
| 5,605,750 A | * | 2/1997 | Romano et al. | 428/304.4 |
| 5,624,482 A | | 4/1997 | Kijimuta et al. | |
| 5,644,350 A | | 7/1997 | Ando et al. | |
| 5,660,622 A | | 8/1997 | Nikoloff | |
| 5,683,784 A | | 11/1997 | Nakao et al. | |
| 5,686,602 A | | 11/1997 | Farooq et al. | |
| 5,688,603 A | | 11/1997 | Iqbal et al. | |
| 5,750,200 A | | 5/1998 | Ogawa et al. | |
| 5,759,673 A | | 6/1998 | Ikezawa et al. | |
| 5,853,965 A | | 12/1998 | Haydock et al. | |
| 5,866,282 A | | 2/1999 | Bourdelais et al. | |
| 5,874,205 A | | 2/1999 | Bourdelais et al. | |
| 5,891,611 A | * | 4/1999 | Majumdar et al. | 430/529 |
| 5,955,185 A | | 9/1999 | Yoshino et al. | |
| 5,981,126 A | | 11/1999 | Majumdar et al. | |
| 6,033,466 A | | 3/2000 | Ito | |
| 6,063,836 A | | 5/2000 | Ito et al. | |
| 6,177,501 B1 | | 1/2001 | Ito et al. | |
| 6,281,270 B1 | | 8/2001 | Ito et al. | |
| 6,555,610 B1 | | 4/2003 | Blanton et al. | |

FOREIGN PATENT DOCUMENTS

| | | | |
|---|---|---|---|
| EP | 0 709 221 A1 | | 5/1996 |
| EP | 0 732 218 A1 | | 9/1996 |
| EP | 0732218 A1 | * | 9/1996 |
| EP | 0 818 322 A1 | | 1/1998 |

OTHER PUBLICATIONS

I. H. Hall, "Structure of Crystalline Polymers", 1984, pp. 267–269.

Research Disclosure, #30819, "Methods and Apparatus for Improving Contrast in Copying Pen Plot Originals", 12/99, pp. 913–914.

M. Chanda & S.K. Roy, Plastics Technology Handbook, 1993, Chapter 4, p. 432.

M. Chanda & S.K. Roy, Plastics Technology Handbook, 1993, Chapter 4, p. 510–511.

T. Lan et al, "Mechanism of Clay Tactoid Exfoliation in Epoxy–Clay Nanocomposites," 1995, pp. 2144–2150.

Japanese Patent Abstract 62174148 A.

* cited by examiner

*Primary Examiner*—Paul Thibodeau
*Assistant Examiner*—Nikolas J Uhlir
(74) *Attorney, Agent, or Firm*—Paul A. Leipold; Lynne M. Blank

(57) ABSTRACT

The invention relates to an imaging member comprising a substrate and an image layer comprising smectite clay particles intercalated with polyvinyl pyrrolidone and dispersed in polyethylene oxide.

24 Claims, 4 Drawing Sheets

IMAGE LAYER COMPRISING INTERCALATED CLAY PARTICLES

CROSS REFERENCE TO RELATED APPLICATION

FIELD OF THE INVENTION

This invention relates to an imaging member comprising a substrate and an image layer comprising smectite clay particles intercalated with polyvinyl pyrrolidone and dispersed in polyethylene oxide. More particularly, the present invention relates to an ink jet image recording element, with a transparent image layer which yields printed images with excellent image quality and fast drying.

BACKGROUND OF THE INVENTION

In the field of ink jet printing, it has been well known to employ one or more ink jet assemblies connected to a source of ink. Each ink jet is typically electromagnetically energized to emit uniform droplets of ink as a continuous stream or as individual droplets. The droplets are directed onto the surface of a moving web and controlled to form printed characters. In view of this technique, the quality of printing, using the ink jet recording process, is highly dependent on jet operation and the properties of the ink and particularly the surface characteristics of the imaging media and the type of coatings applied thereon. The ink must be capable of forming stable ink droplets under pressure and must readily emerge from the ink jet. Typically, the ink formulation is water based and contains organic addenda to prevent drying of the ink at the nozzle. However, the absorption of these inks by the recording sheet has been problematic, particularly in the area of multicolor printing where two or more ink drops may overlap on the surface of the recording sheet.

To ensure good image quality, the recording sheet must absorb the ink rapidly and, at the same time, immobilize the ink dye on the sheet surface. Good absorption reduces the ability of the ink to transfer to sheet handling rollers and other printer machine parts while immobilization of the ink dye ensures high optical density.

Unfortunately, imaging media with high absorbency draw the ink deeply into the media, which sacrifices optical density. Moreover, such recording sheets suffer from feathering and poor sharpness. In addition, high quality papers with low absorbency suffer from off-set because the ink is not absorbed rapidly and smearing often occurs.

Due to the advent of high quality, low cost, color ink jet printers and advancements in commercial papermaking, there is a demand for high color density and clear color tone resolutions. Paper for recording sheets used in such ink jet printing must rapidly absorb the ink and must be free from the flow-out of ink and from the danger of staining even if the paper is touched just after printing. Further, the diffusion of ink laterally on the recording sheet must be prevented in order to achieve high resolution without blurring. Thus, for obtaining color images, having good color density and resolution with good absorbing property ensuring fast drying, as well as optical brightness, is a critical need to be fulfilled.

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol or a polyhydric alcohol or a mixed solvent of water and other water miscible solvents such as a monohydric alcohol or a polyhydric alcohol.

The recording elements typically comprise a support or a support material having on at least one surface thereof an ink-receiving or image-forming layer. The elements include those intended for reflection viewing, which usually have an opaque or reflective support, and those intended for viewing by transmitted light, which usually have a transparent support.

U.S. Pat. Nos. 5,045,864; 5,084,338; 5,126,193; 5,126,194; 5,126,195; 5,139,867 and 5,147,717 teach about image forming layers containing polyvinyl pyrrolidone, polyalkylene oxide, and polyvinyl alcohol with different addenda, such as different surfactants, inert particles, and polyester particles of various specificity.

U.S. Pat. No. 5,624,482 describes a porous alumina hydrate layer on a substrate, which can cause gelling of water soluble polymer in the ink.

U.S. Pat. No. 5,660,622 describes a coating composition for ink jet recording sheets, which includes a combination of hydrated amorphous synthetic silica, a synthetic binder, a cationic agent, a leveling-flow modifier, a dispersing agent, and an optical brightener, resulting in a porous water-absorbing imaging layer.

U.S. Pat. No. 5,686,602 describes a cellulose polymer network cross-linked with metal ions having incorporated therein a colloidal sol containing metal oxide-hydroxide particles resulting in a microporous film.

U.S. Pat. No. 5,759,673 describes a two layered structure with a foamed undercoat of polymeric binder and an image receiving layer containing 50–90% amorphous silica.

U.S. Pat. No. 5,750,200 describes a two layered cast-coated structure with an image receiving layer of pigment and binder and a gloss-providing layer of pigment and latex.

U.S. Pat. No. 5,688,603 describes a two layered structure with an absorbing layer of water absorbent polymer and a cross-linkable polymer with a cross-linking agent, and an optically clear topcoat of hydroxycellulose, fluorocarbon surfactants and metal chelate.

U.S. Pat. No. 5,576.088 describes a two layered, cast-coated structure with an image receiving layer of pigment and binder and a gloss-providing layer of pigments of <300 nm size (either colloidal silica or polystyrene beads) and styrene-butadiene latex.

U.S. Pat. No. 5,171,626 describes a two layered structure with aluminum oxide in both layers, but with the lower layer particle size being <20 $\mu$m and the upper layer particle size being <70 $\mu$m.

U.S. Pat. No. 5,560,996 describes a dye-receiving layer, comprising an intercalated compound capable of fixing water-soluble dyes to a printing paper due to the intercalation based on ion-exchange. The intercalated compounds are suggested to be montmorillonoids for water-soluble cationic dyes, and hydrotalcite-group minerals for water-soluble cationic dyes.

European Patent Application EP 0 732 218 A1 describes an ink-receiving layer comprising synthetic clay with or without any polymeric binder.

European Patent Application EP 0 709 221 A1 discloses an ink receptive coating containing polyvinyl pyrrolidone, an acrylic copolymer, and a quaternized acrylate copolymer hydroxyethyl cellulose and hydroxypropyl methyl cellulose, polyvinyl alcohol, and vinyl pyrrolidone copolymer.

European Patent Application EP 0 818 322 A1 discloses an ink jet recording sheet with a substrate impregnated or coated with a cationic compound, an ink-receiving layer containing pigment and a binder, and a gloss layer containing a polymer resin produced from ethylenically unsaturated monomers.

Although the related patent literature is replete with inventions, a great many problems still exist in the art. For example, the use of hydrophilic polymers as an imaging layer often provides a slow drying tacky surface not conducive for multiple stacking of printed sheets. Porous/microporous imaging layers can somewhat ameliorate the situation, but at a cost of substantially reducing the gloss of the substrate or "quality" of the image. Additionally, such layers may not be completely haze-free for use in applications such as transparencies. Multiple layers are proposed for improved properties, but co-optimization of each functional layer, ensuring their compatibility as well as interlayer adhesion, and robust manufacturing of such imaging elements often pose a formidable challenge.

In general, the requirements for an image-recording medium or element for ink-jet recording are very demanding. It is well known that in order to achieve and maintain photographic-quality images on such an image-recording element, the recording element must:

(1) be readily wetted so there is no puddling, i.e., coalescence of adjacent ink dots, which leads to nonuniform density;

(2) exhibit no image bleeding;

(3) exhibit the ability to absorb high concentrations of ink and dry quickly to avoid elements blocking together when stacked against subsequent prints or other surfaces;

(4) provide a high level of gloss and be sufficiently insoluble in typical ink solvents to avoid development of differential gloss;

(5) exhibit no discontinuities or defects due to interactions between the support and/or layer(s), such as cracking, repellencies, comb lines and the like;

(6) not allow unabsorbed dyes to aggregate at the free surface causing dye crystallization, which results in bloom or bronzing effects in the imaged areas;

(7) be optimized image fastness to avoid fade from contact with water or radiation by daylight, tungsten light, or fluorescent light.

While a wide variety of different types of image-recording elements for use with ink jet ink devices have been proposed heretofore, there are many unsolved problems in the art and many deficiencies in the known products which have severely limited their commercial usefulness.

PROBLEM TO BE SOLVED BY THE INVENTION

There remains a need for the development of an imaging member, with a haze-free, transparent, fast drying, non-tacky, glossy, smooth imaging layer capable of bearing photographic quality images with high optical density.

SUMMARY OF THE INVENTION

It is an object of the invention to provide an imaging member with an image layer that can provide photographic quality images with high optical density.

It is another object to provide an imaging member that can be recorded or printed in a typical ink jet recording or printing system.

It is a further object to provide an imaging layer that is smooth, non-tacky, fast-drying and haze free that can be used for reflective, as well as transparent imaging supports.

It is an additional object of the invention to provide a method of forming an image receiving layer with the aforesaid qualities.

These and other objects of the invention are accomplished by providing an imaging member comprising a substrate and an image layer comprising smectite clay particles intercalated with polyvinyl pyrrolidone and dispersed in polyethylene oxide.

ADVANTAGEOUS EFFECT OF THE INVENTION

The invention provides an imaging member capable of providing photographic quality images with exceptionally high optical density when the imaging member is printed in a typical ink jet printer.

DETAILED DESCRIPTION OF THE INVENTION

Figure 1:
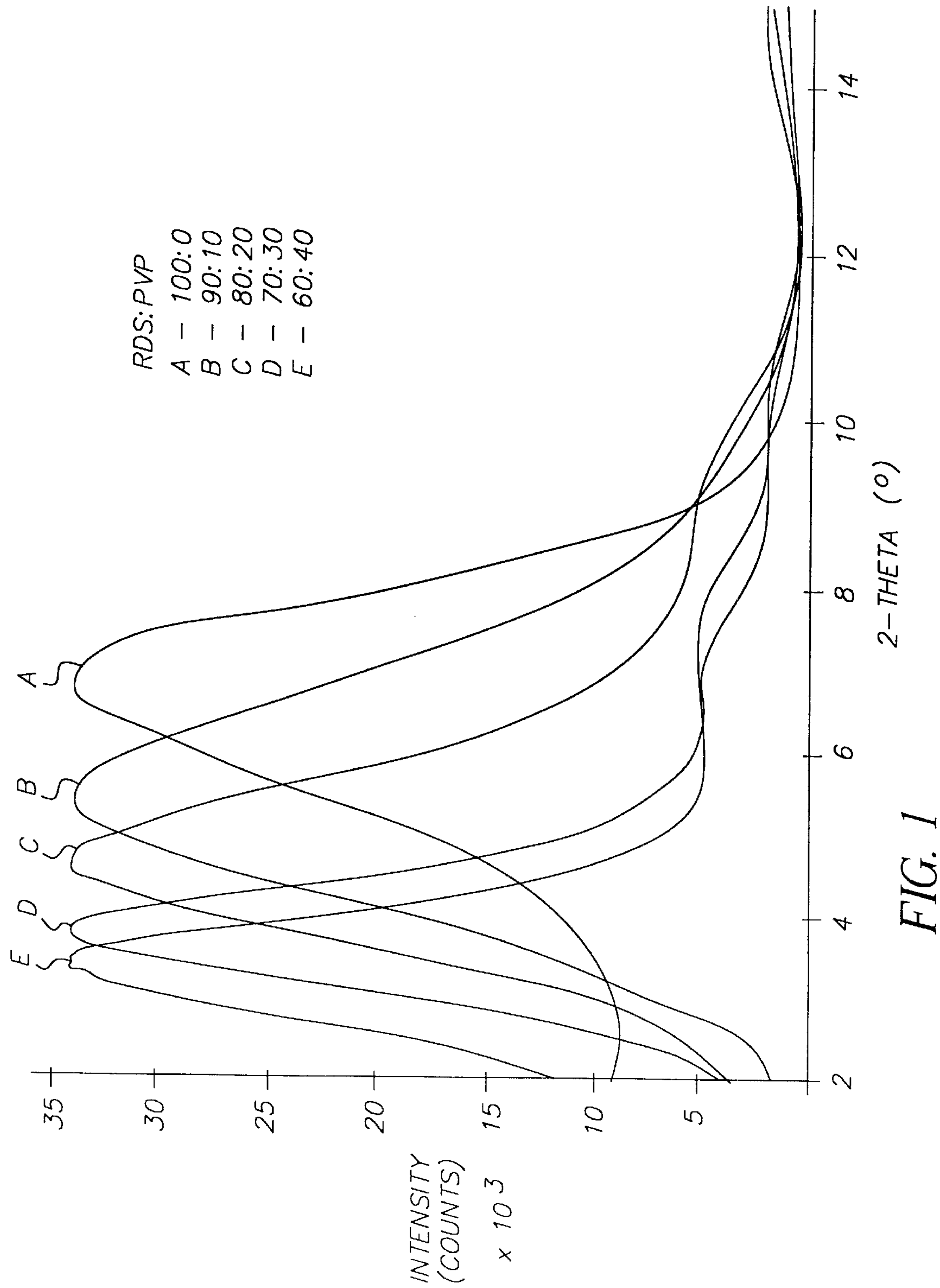
FIG. 1 shows XRD patterns from dry samples of smectite clay intercalated with polyvinyl pyrrolidone at different weight % of polymer.

The invention has numerous advantages over prior practices in the art. The invention provides an imaging member comprising an image layer, which comprises smectite clay particles (component A) intercalated with polyvinyl pyrrolidone (component B) and dispersed in polyethylene oxide (component C). The image layer of the invention is transparent, fast drying, and capable of bearing photographic quality images that can be printed in an ordinary ink jet printing system. The imaging layer of the invention is haze-free and, therefore, is suitable for both transparent and reflective media. The imaging member is capable of fast drying upon printing and, thus, allows multiple stacking and immediate handling of imaging member, without ink smudging/transfer or sticking. This feature allows for increased throughput of the ink jet printing system. In one of its simplest embodiments, the present invention provides a single imaging layer, as opposed to multiple layers proposed by many inventions of the art. These and other advantages will be apparent from the detailed description below.

Any smectite clay can be used as component A in the invention, but particularly preferred is synthetic smectite clay which closely resembles the natural clay mineral hectorite in both structure and composition. Hectorite is a natural, swelling clay which is relatively rare and occurs contaminated with other minerals such as quartz which are difficult and expensive to remove. Synthetic smectite is free from natural impurities, prepared under controlled conditions. One such synthetic smectite is commercially marketed under the tradename Laponite by Laporte Industries, Ltd of UK through its US subsidiary, Southern Clay Products, Inc. It is a 3-layered hydrous magnesium silicate in which magnesium ions, partially replaced by suitable monovalent ions such as lithium, sodium, potassium, and/or vacancies, are octahedrally bound to oxygen and/or hydroxyl ions, some of which may be replaced by fluorine ions, forming the central octahedral sheet; such an octahedral sheet is sandwiched between two tetrahedral sheets of silicon ions, tetrahedrally bound to oxygen. The synthetic smectite clay suitable for this invention is comprised of particles of a lateral dimension between 0.005 $\mu$m and 10 $\mu$m and a thickness between 0.0005 $\mu$m and 0.1 $\mu$m. The preferred lateral dimension is between 0.005 $\mu$m and 1 $\mu$m, and the preferred thickness is between 0.001 $\mu$m and 0.1 $\mu$m. The most preferred lateral dimension for synthetic smectite clay is between 0.005 $\mu$m and 0.05 $\mu$m.

There are many grades of Laponite such as RD, RDS, J, S, etc., each with unique characteristics and can be used for the present invention. Some of these products contain a polyphosphate peptizing agent such as tetrasodium pyrophosphate for rapid dispersion capability; alternatively, a suitable peptizer can be incorporated into Laponite later on for the same purpose.

Polyvinyl pyrrolidone used in this invention as component B is preferably water-soluble and is capable of intercalating inside the clay lattice. U.S. Pat. No. 5,552,469 shows that polyvinyl pyrrolidone can be used to intercalate clay. Polyvinyl pyrrolidone is produced by free-radical-initiated chain polymerization of N-vinyl pyrrolidone. Polymerization is usually carried out in an aqueous solution to produce a solution containing 30% polymer. Polyvinyl pyrrolidone is commercially available either in a liquid form or as a dried powder. Details about polyvinyl pyrrolidone can be found in appropriate literature, e.g., M. Chanda and S. K. Roy, Plastics Technology Handbook, Marcel Dekker, Inc., New York, (1993), p. 432. Component B of the present invention can alternatively be an interpolymer of vinyl pyrrolidone with copolymerizable monomers such as vinyl acetate, methyl acrylate, methyl, methacrylate, ethyl acrylate, ethyl methacrylate, butyl acrylate, butyl methacrylate, methyl acrylamide, methyl methacrylamide, and vinyl chloride. However, it is important that these interpolymers are also capable of intercalating inside the clay lattice. Typical molecular weight desired of these polymers for application in this invention fall between 100 and 1,000,000, preferably between 1000 and 500,000, and most preferably between 20,000 and 50,000. A wide variety of the vinyl pyrrolidone polymers are commercially available and/or are disclosed in a number of U.S. Patents including U.S. Pat. Nos. 4,741,969; 4,503,111; 4,555,437 and 4,578,285.

Polyethylene oxide used in the present invention as component C is a water soluble polymer which can intercalate inside smectite clays. Polyethylene oxide in its neat form is found to be semicrystalline with a monoclinic crystal structure with chains in a 7/2 helical conformation (C. P. Buckley and A. J. Kovacs, Structure of Crystalline Polymers, I. H. Hall ed., Elsevier Applied Science Pub., New York, (1984), p. 267). Polyethylene oxide can be obtained as commercial products from a number of sources, such as PEO™ from Seitetsu Kagaku Company, Ltd. (Japan), Alkox™ from Meisei Chemical Works, Ltd. (Japan), or Polyox™ from Union Carbide (USA). Polyethylene oxides of low molecular weight, i.e., below 3000, are terminated mainly by hydroxyl groups and are often referred to as polyethylene glycols. Commercial polyethylene oxide resins can be supplied in the molecular weight range of 100,000 to 1 million and above. These materials are free flowing dry powders soluble in a broad range of solvents including water as noted in literature, M. Chanda and S. K. Roy, Plastics Technology Handbook, Marcel Dekker, Inc., New York, (1993), p. 510. The molecular weight range of polyethylene oxide suitable for this invention is 1,000 to 5,000,000, with a preferred range of 100,000 to 500,000.

Dispersion of synthetic clay in any polymeric matrix plays a critical role in the performance of the clay-containing layer. The dispersion of clay particles in polymer can result in the formation of three general types of composite materials as discussed by Lan et al (T.Lan, P. D. Kaviratna, and T. J. Pinnavia, Chem. Mater. 7, 2144(1995)). (1) Conventional composites may contain clay with the layers unintercalated in a face-to-face aggregation. Here the clay platelet aggregates are simply dispersed with macroscopic segregation; (2) Intercalated clay composites are intercalation compounds of definite structure formed by the insertion of one or more molecular layers of polymer into the clay host galleries; (3) Finally, exfoliated clay-polymer composites where singular clay platelets are dispersed in a continuous polymer matrix.

Intercalation and exfoliation of clay can be conveniently monitored by measuring the basal (001) spacing of the clay platelets using x-ray diffraction technique, as illustrated in U.S. Pat. Nos. 5,554,670; 5,891,611; and 5,981,126.

With intercalation of a polymer in the clay gallery, an increase in the basal spacing of the clay is observed. When completely exfoliated, the diffraction peaks disappear since the crystallographic order is lost.

It is known that both polyvinyl pyrrolidone and polyethylene oxide can intercalate inside the clay lattice. However, it is unexpectedly found through the present invention that when smectite clay intercalated with polyvinyl pyrrolidone is further dispersed in polyethylene oxide, a unique composite material is obtained, which can be formed into an image layer of an imaging member with highly desirable characteristics. The unique morphology of this composite material, as characterized by X-ray diffraction, is provided hereinbelow.

Characterization of composite materials comprising smectite clay, specifically the state of clay intercalation and the degree of crystallinity of polyethylene oxide, is carried out using X-ray diffraction. A Rigaku RU-300 diffractometer equipped with a copper anode, diffracted beam graphite monochromator, and scintillation detector is utilized for diffraction pattern measurement. Specifically, synthetic smectite clay shows a (001) basal plane diffraction peak with an interplanar spacing of 13 Å under ambient conditions of 20% relative humidity. If the clay is intercalated, this basal plane spacing increases reflecting a shift in the X-ray diffraction peak towards lower 2θ diffraction peak angle in the diffraction pattern, as disclosed in U.S. Pat. Nos. 5,891,611 and 5,981,126.

Figure 2:
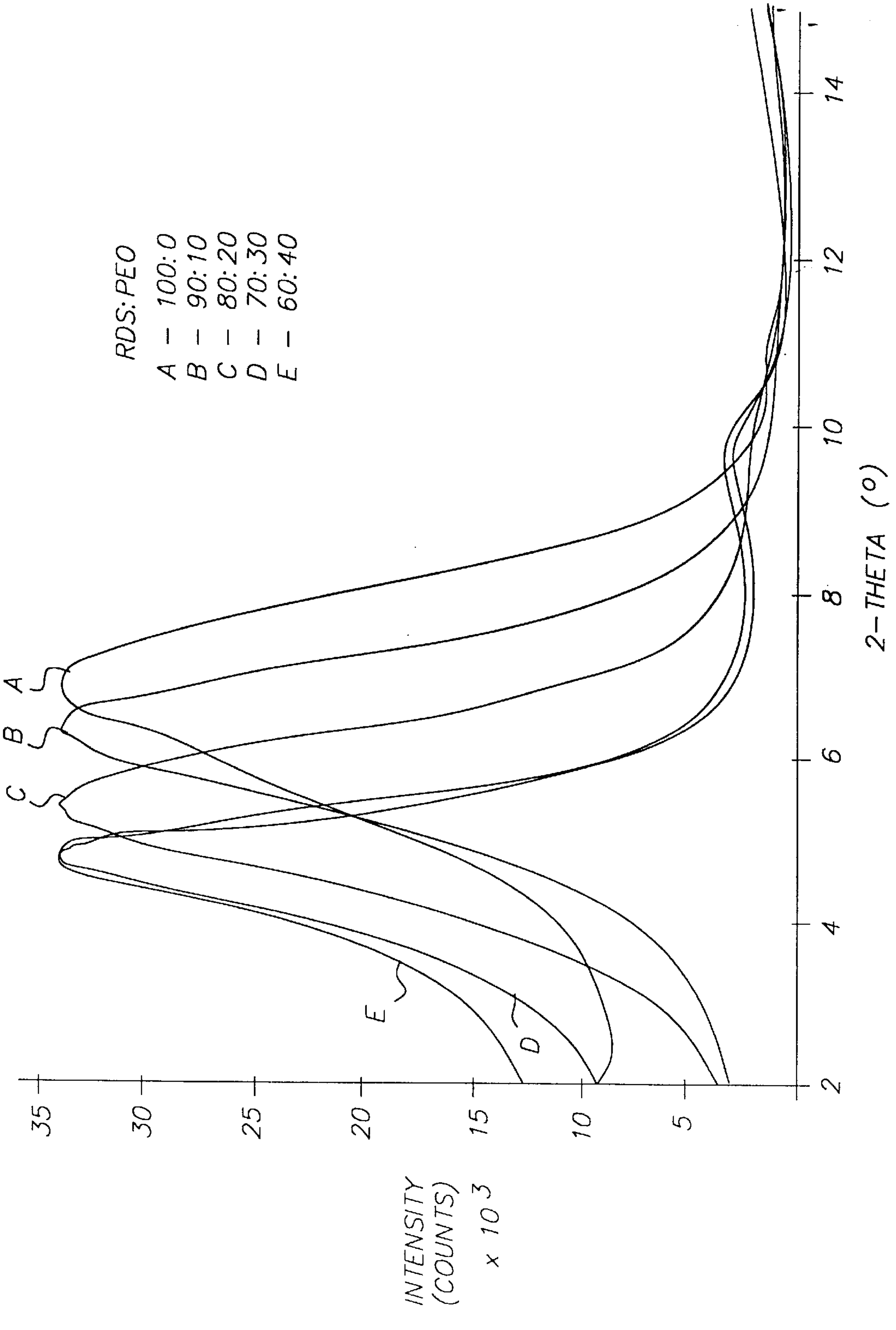
FIG. 2 shows XRD patterns from dry samples of smectite clay intercalated with polyethylene oxide at different weight % of polymer.

FIG. 1 shows the XRD patterns of various dry samples of smectite clay-polyvinyl pyrrolidone composites, with different polyvinyl pyrrolidone weight %. With increasing wt. % of polyvinyl pyrrolidone, a shift of the (001) clay peak towards lower 2θ can be noticed which demonstrates increased intercalation of the clay lattice with increasing amount of polymer. FIG. 2 shows similar XRD pattern of various dry samples of smectite clay-polyethylene oxide composites, with different polyethylene oxide weight %. Here, also with increasing wt. % of polyethylene oxide, a shift of the (001) clay peak towards lower 2θ can be noticed which demonstrates increased intercalation of the clay lattice. Thus, FIGS. 1 and 2 confirm that both polyvinyl pyrrolidone and polyethylene oxide can independently intercalate inside the clay lattice.

Figure 3:
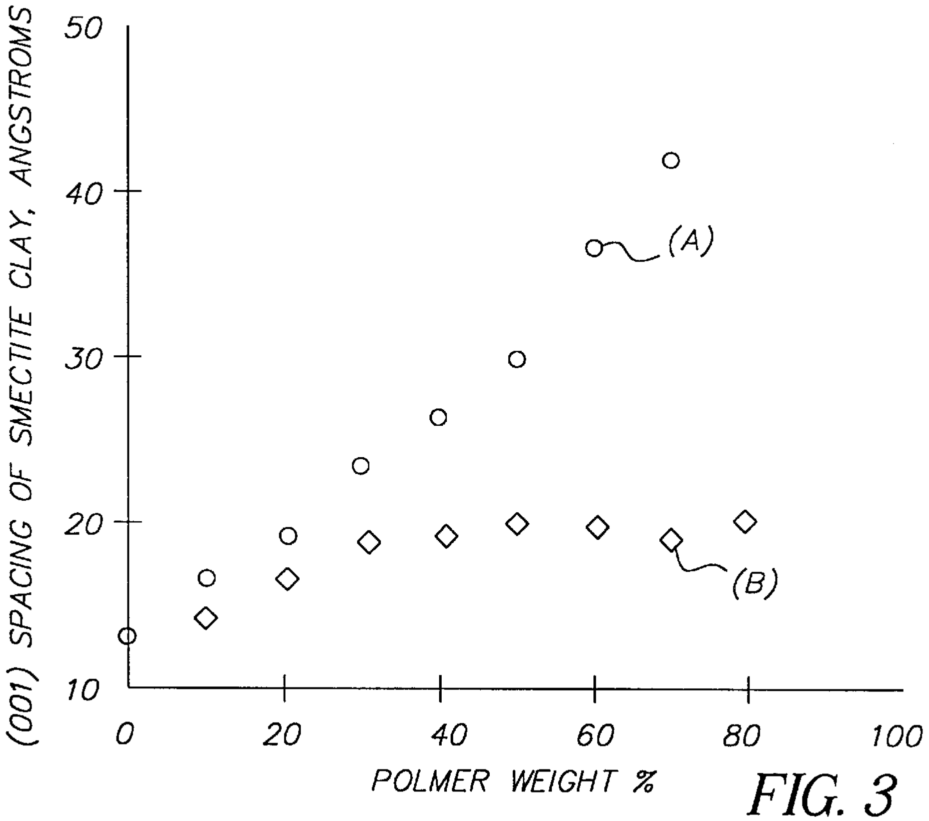
FIG. 3 shows Smectite clay (001) spacing as a function of polymer weight %, for (a) smectite clay-polyvinyl pyrrolidone composites and (b) smectite clay-polyethylene oxide composites.

In FIG. 3, the (001) spacing of smectite clay is plotted as a function of polymer weight %, for a comparison of (a) smectite clay-polyvinyl pyrrolidone composites and (b) smectite clay-polyethylene oxide composites. It is clear that for the same weight % polymer, polyvinyl pyrrolidone causes more intercalation in the clay lattice than polyethylene oxide. Also, it is clear that with polyethylene oxide after an initial increase, the smectite clay (001) spacing attains a plateau, whereas with increasing amount of polyvinyl pyrrolidone, the clay spacing continues to increase monotonously with increasing amount of polymer.

Figure 4:
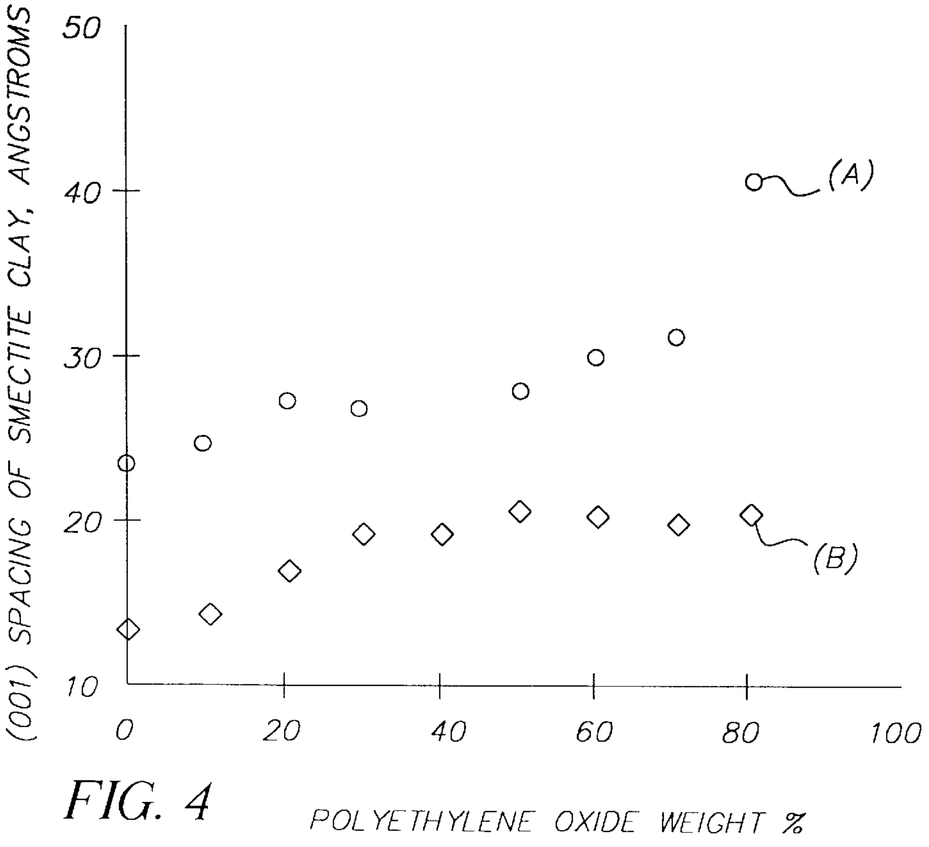
FIG. 4 shows Smectite clay (001) spacing as a function of polyethylene oxide weight % for (a) smectite clay-polyvinyl pyrrolidone-polyethylene oxide composites and (b) smectite clay-polyethylene oxide composites.

One such smectite clay-polyvinyl pyrrolidone composite, namely one with a clay:polyvinyl pyrrolidone weight ratio of 70:30, is further dispersed in polyethylene oxide at different weight ratios to form smectite clay-polyvinyl pyrrolidone-polyethylene oxide composites. In FIG. 4, the (001) spacing of smectite clay is plotted as a function of polyethylene oxide weight %, for these 3-component smectite clay-polyvinyl pyrrolidone-polyethylene oxide composites is plotted as "a". The corresponding data from smectite clay-polyethylene oxide composites (from FIG. 3*b*) are also reproduced in FIG. 4 for a direct comparison as plot "b". It is obvious that smectite clay, already intercalated with polyvinyl pyrrolidone, can be further intercalated by polyethylene oxide to an extent not attainably by intercalation of polyethylene oxide alone. It can be noted that with dispersion in just polyethylene oxide, the smectite clay (001) spacing attains a plateau of approximately 20 Å, measured at 20% RH, which corresponds to roughly a 50% increase from its unintercalated state. If smectite clay is first intercalated with polyvinyl pyrrolidone and then dispersed in polyethylene oxide, the aforesaid plateau in clay (001) spacing is far exceeded.

These X-ray data demonstrate that smectite clay intercalated with polyvinyl pyrrolidone, when further dispersed in polyethylene oxide, forms a unique nanocomposite material unattainable by any combination of just smectite clay and polyethylene oxide. It appears that polyvinyl pyrrolidone opens up the smectite clay lattice through its initial intercalation, making it amenable for polyethylene oxide to further intercalate. It is suspected that this unique morphology of the nanocomposite material of the present invention aids in the most favorable absorption of the ink, when printed upon in an ink jet system, resulting in some of the advantageous characteristics, such as fast drying and high optical density. A "nanocomposite material" is a composite where one of the components is of the order of less than 400 nanometers.

Figure 5A:
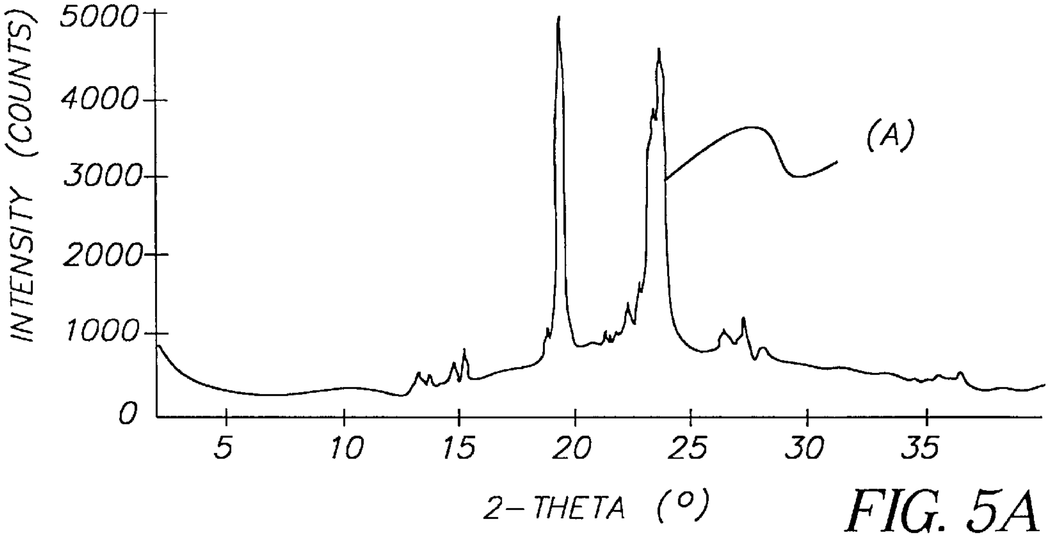
FIG. 5 shows XRD patterns from dry samples of (a) neat polyethylene oxide, (b) clay-polyvinyl pyrrolidone-polyethylene oxide nanocomposite containing 80% polyethylene oxide, and (c) clay-polyvinyl pyrrolidone-polyethylene oxide nanocomposite containing 50% polyethylene oxide.
Figure 5B:
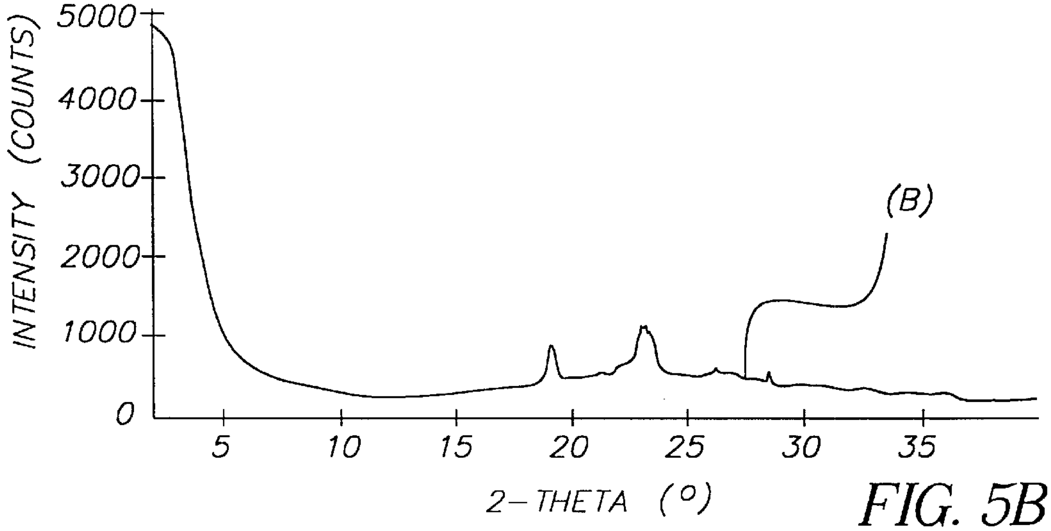
Figure 5C:
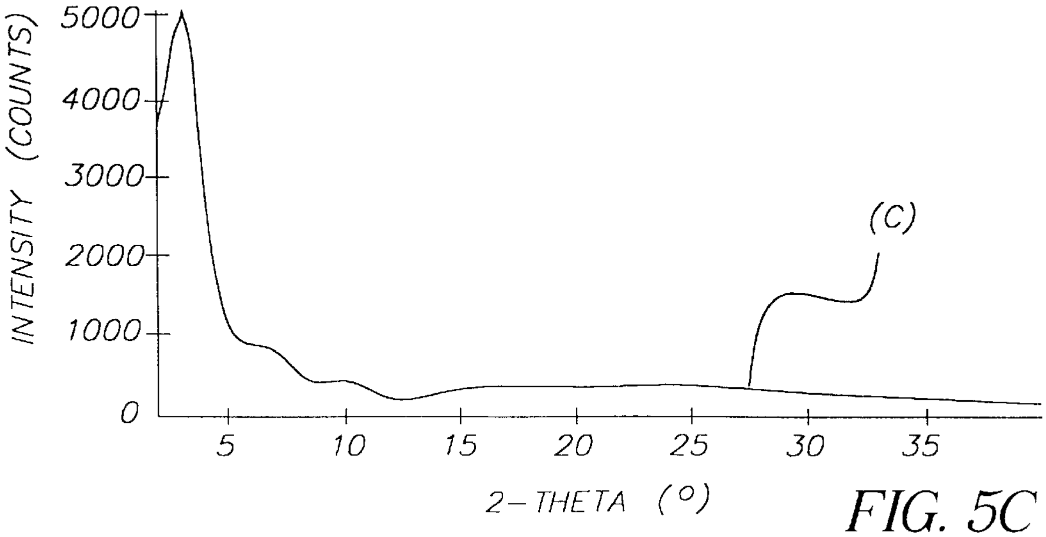

Another important aspect of the smectite clay-polyvinyl pyrrolidone-polyethylene oxide nanocomposite is the degree of crystallinity of the polyethylene oxide. It is known that polyethylene oxide, particularly the high molecular weight grade, retains a significant amount of crystallinity. This crystalline phase can adversely scatter light and, therefore, produce undesirable haze. Crystallinity of polyethylene oxide can be assessed by the absence or presence of primary diffraction peaks at 2θ angles of 19.2° and 23.2°, when using CuKa radiation, as shown in FIG. 5. FIG. 5 shows the X-ray diffraction peaks of (a) neat polyethylene oxide, (b) clay-polyvinyl pyrrolidone-polyethylene oxide composite containing 80% polyethylene oxide, and (c) clay-polyvinyl pyrrolidone-polyethylene oxide composite containing 50% polyethylene oxide. The degree of crystallinity of polyethylene oxide in the clay-polyvinyl pyrrolidone-polyethylene oxide composite can be assessed by measuring the peak height ratio of the X-ray diffraction peak at a Bragg angle of 23.2°2θ, attributed to polyethylene oxide to the X-ray diffraction (001) peak, attributed to the clay. This peak height ratio is a measure of crystallinity and will be referred to as the "$I_{PEO}/I_{Clay}$" ratio henceforth. In order to ascertain transparency or no haze in the material of the invention, $I_{PEO}/I_{Clay}$ ratio should be less than 0.6, and preferably less than 0.3, and more preferably less than 0.1 to give the least haze.

European Patent Application EP 0 732 218 A1 describes an ink-receiving layer comprising synthetic clay with or without any polymeric binder. However, in the absence of a polymeric binder, such a layer is not likely to have adequate physical integrity.

U.S. Pat. No. 5,560,996 describes a dye-receiving layer comprising an intercalated compound, which can be montmorillonoids for cationic dyes or hydiotalcites for anionic dyes. However, it teaches of intercalation of inorganic ions or quaternary ammonium compounds in montmorillonoids which can make them more hydrophobic, resulting in slow ink drying. U.S. Pat. No. 5,560,996 does not teach of intercalating clay with polyvinyl pyrrolidone and its further dispersion in polyethylene oxide, as provided in the present invention.

Intercalation of Smectite Clay in Polyvinyl Pyrrolidone

In a preferred embodiment of the present invention, the intercalation of smectite clay with polyvinyl pyrrolidone can be accomplished in the following manner:

A first dispersion of clay and polyvinyl pyrrolidone in water can be prepared at a total solid content of less than 99% and preferably less than 50% and more preferably less than 10%. This dispersion can be prepared by combining dry smectite clay, polyvinyl pyrrolidone, and water in any order. Alternatively, an aqueous clay sol (clay dispersion in water) can be combined with either dry polyvinyl pyrrolidone or its aqueous solution, in any order. The clay:polyvinyl pyrrolidone ratio can vary between 80:20 and 20:80, and preferably between 70:30 and 50:50 for best transparency. In a most preferred embodiment, an aqueous clay sol of less than 10 weight % solid is slowly added to an aqueous solution of polyvinyl pyrrolidone of less than 10 weight % solid, maintaining a clay:polyvinyl pyrrolidone ratio of 70:30. The first dispersion is agitated to ensure intercalation of polyvinyl pyrrolidone inside the clay lattice. Depending on the viscosity of the first dispersion, this intercalation can be achieved through agitation for less than an hour to a few hours. It is important to ensure that the smectite clay intercalated with polyvinyl pyrrolidone in its dry form and under 20% relative humidity exhibits an increase in its (001) spacing of at least 50% when compared with its unintercalated state under the same conditions. Alternatively, the smectite clay intercalated with polyvinyl pyrrolidone in its dry form and under 20% relative humidity should exhibit a (001) spacing of at least 20 Å in order to get the best transparency in polymer composites.

Besides clay, polyvinyl pyrrolidone, and water, the first dispersion can contain additional ingredients. Such additional ingredients can include, but are not limited to, surfactants, coating aids, dispersants, other solvents, plasticizers, inorganic or organic particles, matte, electrically conducting or non-conducting materials, salts, electrolytes, other polymers and clay intercalants (materials capable of intercalating inside the clay lattice), lubricating agents, cross-linking agents, colorants and dyes, compatibilizers, biocites, pH controllers, defoamers, viscosity modifiers, waterproofing agents, UV absorbing agents, mildew-proofing agents, antioxidants, optical brighteners, controlled-release agents, drugs, aroma or fragrance providing agents, etc. Thus, the smectite clay intercalated with polyvinyl pyrrolidone can include any of the aforesaid additional ingredients, as long as these agents do not degrade properties of interest.

Dispersion of Smectite Clay, Intercalated with Polyvinyl Pyrrolidone, in Polyethylene Oxide The smectite clay intercalated with polyvinyl pyrrolidone can be next dispersed in polyethylene oxide to form the second dispersion, wherein the total solid content of the second dispersion is maintained at less than 99% and preferably less than 50%, and more preferably less than 30%. This second dispersion can be formed by either adding dry polyethylene oxide to the first dispersion or by adding an aqueous solution of polyethylene oxide to the first dispersion, or by combining the dry content of the first dispersion, polyethylene oxide, and water in any order. The dry weight % of polyethylene oxide in the dry solid content of the second dispersion can vary from 1 to 75%, preferably from 10 to 70%, and more preferably from 30 to 65%. The second dispersion is agitated to ensure further intercalation of the polyethylene oxide inside the clay lattice, which is already intercalated with polyvinyl pyrrolidone. Depending on the viscosity of the second dispersion, this can be achieved through agitation for less than one hour to a few hours.

For a successful practice of the present invention, it is preferred to ensure that the smectite clay, intercalated with polyvinyl pyrrolidone and further dispersed in polyethylene oxide in its dry form and under 20% relative humidity, exhibits an increase in its (001) spacing of at least 50% when compared with its unintercalated state under the same conditions. This preferred increase in its (001) spacing of at least 50% is henceforth considered to be indicative of the smectite clay being "sufficiently intercalated." Alternatively, the smectite clay intercalated with polyvinyl pyrrolidone and further dispersed in polyethylene oxide in its dry form and under 20% relative humidity should preferably exhibit a (001) spacing of at least 20 Å. Additionally, it is important to ensure that the $I_{PEO}/_{Clay}$ ratio of the smectite clay intercalated with polyvinyl pyrrolidone and further dispersed in polyethylene oxide in its dry form and under 20% relative humidity is less than 0.6, and preferably less than 0.3, and more preferably less than 0.1, for application in haze free coatings.

Besides clay, polyvinyl pyrrolidone, polyethylene oxide and water, the second dispersion can contain additional ingredients. Such additional ingredients can include, but are not limited to, surfactants, coating aids, dispersants, other solvents, plasticizers, inorganic or organic particles, matte, electrically conducting or non-conducting materials, salts, electrolytes, other polymers and clay intercalants (materials capable of intercalating inside the clay lattice), lubricating agents, cross-linking agents, colorants and dyes, compatibilizers, biocites, pH controllers, defoamers, viscosity modifiers, waterproofing agents, UV absorbing agents, mildew-proofing agents, antioxidants, optical brighteners, controlled-release agents, drugs, aroma or fragrance providing agents, etc. Thus, the smectite clay intercalated with polyvinyl pyrrolidone further dispersed in polyethylene oxide can include any of the aforesaid additional ingredients as long as these agents do not degrade properties of interest.

In a preferred embodiment, the second dispersion is used as the coating composition for the image layer of the imaging member of the present invention. This coating composition can be applied on one side or both sides of a suitable substrate by any number of well-known techniques, including dip-coating, wound wire rod coating, hopper coating, doctor blade coating, rod coating, gravure and reverse roll coating, slide coating, bead coating, curtain coating, spray coating, and the like. Known coating and drying methods are described in further detail in *Research Disclosure* 308119, December 1989, pp.1007–1008. After coating, the layer can be dried by simple evaporation, which may be accelerated by known techniques such as convection and/or IR heating. The thickness of the dry image layer can vary between 0.1 μm and 100 μm, but preferably between 1 μm and 25 μm because for low cost and effective ink absorption.

In one embodiment of the invention, the image layer can be placed above, or preferably, below a porous or microporous layer to augment drying without jeopardizing the photographic quality of the image. These layers can be chosen from any disclosed in the art, e.g., U.S. Pat. Nos. 5,955,185; 5,605,750; 5,683,784; 5,624,482; etc.

Any support or substrate, transparent or reflective can be used for the imaging member of the present invention on which the image layer can be applied. These can include plain or calendered papers, coated or uncoated, synthetic papers, for example, polypropylene and polystyrene, films such as cellulose esters, polyethylene terephthalate, polyethylene naphthalate, poly 1,4-cyclohexanedimethylene terephthalate, polyvinyl acetate, polystyrene, polyimide and polycarbonate, resin coated papers comprising paper as a substrate coated on both sides with film forming resins such as polyolefin, polyvinyl chloride, etc. The aforementioned resin layer may preferably contain, in suitable combination, various additives, for instance, white pigments such as titanium oxide, zinc oxide, talc, calcium carbonate, etc., dispersants, for example, fatty amides such as stearamide, etc., metallic salts of fatty acids such as zinc stearate, magnesium stearate, etc., pigments and dyes, such as ultramarine blue, cobalt violet, etc., antioxidant, fluorescent whiteners, and ultraviolet absorbers.

The polyolefin resin coated papers as per this invention can be prepared by extrusion coating or laminating one or more layers of polyolefin resin on substrate paper. The surface of the substrate paper can be treated for improved adhesion prior to resin coating by any of the known methods of the art, e.g., acid etching, flame treatment, corona discharge treatment, glow discharge treatment, etc. The polyolefin resin coated paper may have a gloss surface, matte surface, silk-like surface, etc.

Suitable polyolefins for the present invention include polyethylene, polypropylene, polymethylpentene, polystyrene, polybutylene, and mixtures thereof. Polyolefin interpolymers including interpolymers of propylene and ethylene such as hexene, butene, and octene are also useful. The present invention is particularly suitable for paper comprising biaxially oriented microvoided polypropylene layer(s), as disclosed in U.S. Pat. Nos. 5,853,965; 5,866,282; and 5,874,205.

The substrate comprising paper for the present invention may comprise normal natural pulp paper and/or synthetic paper, which is simulated paper made from synthetic resin films. However, natural pulp paper mainly composed of wood pulp such as soft wood pulp, hard wood pulp, and mixed pulp of soft wood and hard wood is preferred. The natural pulp may contain, in optional combination, various high molecular compounds and additives, such as dry strength increasing agents, sizing agents, wet strength increasing agents, stabilizers, pigments, dyes, fluorescent whiteners, latexes, inorganic electrolytes, pH regulators, etc.

The substrate may also comprise microporous materials described in U.S. Pat. No. 5,605,750 and references therein. Examples of these materials, processes for making such materials, and their properties are described in U.S. Pat. Nos. 2,772,322; 3,351,495; 3,696,061; 3,725,520; 3,862,030; 3,903,234; 3,967,978; 4,024,323; 4,102,746; 4,169,014; 4,210,709; 4,226,926; 4,237,083; 4,335,193; 4,350,655; 4,472,328; 4,585,604; 4,613,643; 4,681,750; 4,791,144; 4,833,172; 4,861,644; 4,892,779; 4,927,802; 4,872,779; 4,927,802; 4,937,115; 4,957,787; 4,959,208; 5,032,450; 5,035,886; 5,071,645; 5,047,283; and 5,114,438.

The substrate can be of any suitable thickness, but can preferably vary between 1–500 $\mu$m, and more preferably between 25–250 $\mu$m, as it provides sufficient strength at reasonable cost. Antioxidants, antistatic agents, plasticizers, and other known additives may be incorporated into the substrate, if desired. In order to improve adhesion of the image layer to the substrate, the substrate may be subjected to treatments such as those known in the art for this purpose, e.g., acid etching, flame treatment, corona discharge treatment, glow discharge treatment, etc, and/or can be coated with a suitable primer or subbing layer.

Auxiliary layers can be incorporated in the substrate for conveyance, machine handling, curl control, wear and abrasion resistance, anti-blocking, friction control, resistivity and static control, gloss, optical density, waterproofing, light and UV protection, dye-mordanting, compatibility, etc. Any materials known in the art to provide these functions can be incorporated in these auxiliary layers.

Although the imaging member disclosed herein is referred to as being desirable for ink jet printing systems, it can be as desirable for pen plotter assemblies. Pen plotters operate by writing directly on the surface of an imaging member using a pen consisting of a bundle of capillary tubes in contact with an ink reservoir.

The following examples illustrate the practice of this invention. They are not intended to be exhaustive of all possible variations of the invention; Parts and percentages are by weight unless otherwise indicated.

EXAMPLES

A number of coating compositions are used to coat image layers on a variety of substrates. After coating, the wet layers are dried by evaporation and then printed in a commercial ink jet system such as HP Photosmart. Typically, 23 cm X 1 cm stripe each of cyan, magenta, yellow, black, red, blue, and green is printed on test samples and evaluated for different properties.

Each sample is visually inspected for haze, smoothness, inhomogeneity, and print quality.

The gloss of the coated layer on each sample is measured at an angle of 60 degrees to the normal of sample surface with a Gardner Microgloss Meter.

For drying time, a sheet of bond paper is placed over the printed sample as it completes ink jet printing and rolled with a smooth, heavy weight. Then the bond paper is separated from the printed sample and evaluated for transferred ink and compared with standard charts. A ranking of numbers 1–5 is assigned to the sample, wherein No. 1 signifies no ink transfer or instant dry and 5 signifies transfer of ink along the whole length of the printed stripes. A ranking of 1–3 is considered acceptable drying time for the present invention.

The optical densities of the printed stripes of cyan, magenta, yellow, and black are measured using an X-Rite Photographic Densitometer. A densitometer is an optical instrument used to measure the lightness or darkness of an image. Its measured output, called optical density, correlates well with visually perceived lightness or darkness. An optical density of 1.5 and above is considered desirable.

Coating Composition A

Aqueous sol of Laponite RDS (synthetic smectite clay from Southern Clay Products) is mixed with aqueous solution of polyvinyl pyrrolidone (PVP) of molecular weight 30,000 in a ratio of 70:30 to form the first dispersion. The first dispersion is agitated for sufficient time to ensure intercalation of PVP in the smectite clay, as checked by XRD.

The first dispersion is mixed with an aqueous solution of Polyox 750 (polyethylene oxide (PEO) of molecular weight 200,000 supplied by Union Carbide) to form the second dispersion. The concentration of PEO in the solid content of the second dispersion is maintained at 50%. Specifically, the solid content of the second dispersion has a PEO:clay:PVP ratio of 50:35:15. The second dispersion is agitated for sufficient time to ensure further intercalation of the PEO in the clay, as checked by XRD. The second dispersion now is Coating composition A.

Example 1

Example 1 is prepared by applying coating composition A on the subbed side of a polyethylene terephthalate film, subbed with a vinylidene chloride containing polymer. The dry thickness of the coated layer is kept at 15 $\mu$m.

Example 2

Same as Example 1 but coated on paper substrate comprising a surface of biaxially oriented microvoided polypropylene layer(s), similar to those disclosed in U.S. Pat. Nos. 5,853,965; 5,866,282; and 5,874,205.

Example 3

Same as Example 1 but coated on resin coated paper substrate comprising extruded polyethylene surface layers.

Example 4

Same as Example 1 but coated on Georgia Pacific paper substrate without resin coating.

Table 1A lists some of the test data collected from Examples 1–4, prepared in accordance with the present invention. It is clear that the coated layers of the invention produce transparent coatings that can be printed with good dry time. The coated layers of the invention can produce very glossy surfaces on resin coated paper as in Examples 1 and 2. The transparency of the coated layer generally augments the gloss of the substrate. Even with a low gloss (1–4) substrate such as paper, as in Example 4, the image layer of the invention can increase the gloss by a value of 20 or so. Table 1A demonstrates the versatility of the image layer of the invention, as it can be applied to a matte or glossy substrate and can generate an imaging member with a matte or glossy finish, as desired.

TABLE 1A

| Sample | Appearance | Gloss | Clay (001) spacing | $I_{PEO}/I_{Clay}$ | Dry time |
|---|---|---|---|---|---|
| Example 1 | Smooth, transparent | | 28 Å (>50% increase) | 0 | 1–2 |
| Example 2 | Smooth, transparent | 78 | 28 Å (>50% increase) | 0 | 2–3 |
| Example 3 | Smooth, transparent | 79 | 28 Å (>50% increase) | 0 | 1–2 |
| Example 4 | Smooth, transparent | 25 | 28 Å (>50% increase) | 0 | 1 |

Table 1B lists the optical density of the black, cyan, magenta, and yellow stripes printed on Examples 1 and 2. An optical density of 1.5 and above is considered desirable. It is amply clear that the printed images on the examples of the invention more than satisfy this need, demonstrating the capability of the image layer of the present invention to bear photographic quality images.

TABLE 1B

| Sample | Black | Yellow | Magenta | Cyan |
|---|---|---|---|---|
| Example 1 | 2.7 | 1.89 | 2.12 | 2.39 |
| Example 2 | 2.34 | 1.98 | 2.13 | 2.24 |

Coating Composition B

Coating composition B is prepared similar to composition A, except the concentration of PEO in the solid content of the second dispersion herein is kept at 65%. Specifically, the solid content of the second dispersion herein has a PEO-:clay:PVP ratio of 65:24.5:10.5.

Example 5

Example 5 is prepared by applying coating composition B on Georgia Pacific paper substrate, similar to Example 4.

Table 2 lists some of the test data collected from Example 5, prepared in accordance with the present invention. It is clear that Example 5 results in a transparent coating that can be printed with good dry time.

TABLE 2

| Sample | Appearance | Clay (001) spacing | $I_{PEO}/I_{Clay}$ | Dry time |
|---|---|---|---|---|
| Example 5 | Smooth, transparent | 30 Å (>50% increase) | 0 | 1–2 |

Coating Composition C

Coating composition C is prepared similar to composition A, except the concentration of PEO in the solid content of the second dispersion herein is kept at 95%. Specifically, the solid content of the second dispersion herein has a PEO-:clay:PVP ratio of 95:3.5:1.5.

Comp. 1

Comparative sample Comp. 1 is prepared by applying coating composition C on subbed polyethylene terephthalate substrate, similar to Example 1.

Comp. 2

Comparative sample Comp. 2 is prepared by applying coating composition C on Georgia Pacific paper, similar to Example 4.

Table 3 lists some of the test data collected from comparative samples Comp. 1 and 2. It is clear that with $I_{PEO}/I_{Clay}$ ratio much greater than 0.6, Comp. 1 and 2 result in hazy coatings which are not desired.

TABLE 3

| Sample | Appearance | Clay (001) spacing | $I_{PEO}/I_{Clay}$ | Dry time |
|---|---|---|---|---|
| Comp. 1 | Smooth but hazy | >40 Å | >>0.6 | 3 |
| Comp. 2 | Smooth but hazy | >40 Å | >>0.6 | 2 |

Coating Compositions D–G

Coating compositions D, E, F, and G are prepared by mixing acqueous solution of PEO and smectite clay without any PVP, with PEO:clay ratio of 100:0, 75:25, 50:50, and 25:75 respectively.

Comp. 3–6

Comparative samples Comp. 3, 4, 5, and 6 are prepared by applying, coating compositions D, E, F, and G, respectively, on subbed polyethylene terephthalate substrate, similar to Example 1.

As shown in Table 4, comparative samples Comp. 3–6 result in hazy, whitish coatings, indicating that coating compositions without PVP, not in accordance with the present invention, result in inferior quality.

TABLE 4

| Sample | Appearance | Dry-time |
|---|---|---|
| Comp. 3 | white | 3–4 |
| Comp. 4 | whitish | 3 |
| Comp. 5 | hazy | 2 |
| Comp. 6 | whitish | 4 |

Coating Composition H

Coating composition H is prepared similar to composition A except with polyvinyl alcohol (PVOH), instead of PEO. Specifically, the solid content of the second dispersion herein has a PVOH:clay:PVP ratio of 50:35:15.

Comp. 7

Comparative sample Comp. 7 is prepared by applying coating composition H on subbed polyethylene terephthalate substrate, similar to Example 1.

As shown in Table 5, comparative sample Comp. 7 results in a tacky surface with poor drying time, indicating that coating compositions without polyethylene oxide, not in accordance with the present invention, result in inferior performance.

TABLE 5

| Sample | Appearance | Dry-time |
|---|---|---|
| Comp. 7 | Smooth transparent | 4–5 tacky |

Examples 6 and 7

Examples 6 and 7 are prepared by applying coating composition A at a dry thickness of 4 $\mu$m and 6.5 $\mu$m, respectively, on a microporous substrate, namely 7 mil Teslin support, marketed by PPG Industries.

Comp. 8

Comparative sample Comp. 8 is the bare Teslin support of Examples 6 and 7, without any coating.

As shown in Table 6, Examples 6 and 7 of the present invention provide instant drying, just as the comparative sample Comp. 8, but Examples 6 and 7 provide much superior optical density compared to Comp. 8, demonstrating the desirability of the image layers of the present invention on microporous substrates.

TABLE 6

| Sample | Dry-time | Black | Yellow | Magenta | Cyan |
|---|---|---|---|---|---|
| Example 6 | 1 | 2.04 | 1.88 | 1.96 | 2.17 |
| Example 7 | 1 | 2.29 | 2.01 | 2.06 | 2.40 |
| Comp. 8 | 1 | 0.65 | 0.62 | 0.82 | 0.46 |

Comp. 9

Comparative sample Comp. 9 is prepared by applying a microporous layer of alumina hydrate of a boehmite structure with polyvinyl alcohol binder, as per U.S. Pat. No. 5,955,185 at a dry thickness of 5 μm on a 7 mil Teslin support.

Examples 8 and 9

Examples 8 and 9 are prepared by applying coating Composition A at a dry thickness of 2.5 μm and 5.6 μm, respectively, on a 7 mil Teslin support, followed by applying the microporous layer of Comp. 9, as a topcoat of dry thickness of 5 μm. Thus, Examples 8 and 9 comprise two coatings: (1) a top microporous layer overlying (2) a bottom smectite clay-polyvinyl pyrrolidone-polyethylene oxide nanocomposite layer.

As shown in Table 7, Examples 8 and 9 prepared in accordance with the present invention show superior gloss and optical density relative to comparative sample Comp. 9. These results demonstrate that the incorporation of the image layer of the present invention below the microporous layer of U.S. Pat. No. 5,955,185 can significantly augment its gloss and optical density while maintaining fast drying, when printed in an ink jet system.

TABLE 7

| Sample | Gloss | Dry-time | Black | Yellow | Magenta | Cyan |
|---|---|---|---|---|---|---|
| Comp. 9 | 21 | 1 | 1.73 | 1.37 | 1.51 | 1.86 |
| Example 8 | 48 | 1 | 2.24 | 1.64 | 1.68 | 2.06 |
| Example 9 | 46 | 1 | 2.52 | 1.67 | 1.71 | 2.10 |

The invention has been described in detail with particular reference to certain preferred embodiments thereof, but it will be understood that variations and modifications can be effected within the spirit and scope of the invention.

What is claimed is:

1. An imaging member comprising a substrate and a transparent image layer comprising smectite clay particles that are brought into contact with polyvinyl pyrrolidone to form smectite clay particles that are intercalated with polyvinyl pyrrolidone, wherein said intercalated clay particles are subsequently dispersed in polyethylene oxide, and the $I_{peo}/I_{clay}$ is less than 60%.

2. The imaging member of claim 1 wherein said smectite clay is selected from the group consisting of montmorillonite, hectorite, and saponite.

3. The imaging member of claim 1 wherein said smectite clay comprises synthetic smectite.

4. The imaging member of claim 1 wherein said smectite clay comprises layered hydrous magnesium silicate.

5. The imaging member of claim 1 wherein said image layer comprises a mordant.

6. The imaging member of claim 1 wherein said image layer comprises smectite clay and polyvinyl pyrrolidone in a weight ratio between 80:20 and 20:80.

7. The imaging member of claim 1 wherein said image layer comprises smectite clay and polyvinyl pyrrolidone in a weight ratio between 70:30 and 50:50.

8. The imaging member of claim 1 wherein said polyethylene oxide comprises between 1 and 75 weight percent of said image layer.

9. The imaging member of claim 1 wherein said polyethylene oxide comprises between 10 and 70 weight percent of said image layer.

10. The imaging member of claim 1 wherein said polyethylene oxide comprises between 30 and 65 weight percent of said image layer.

11. The imaging member of claim 1 wherein said image layer has a thickness of between 0.1 and 100 μm.

12. The imaging member of claim 1 wherein said image layer has a thickness of between 1 and 25 μm.

13. The imaging member of claim 1 wherein said substrate comprises paper.

14. The imaging member of claim 1 wherein said substrate comprises resin coated paper.

15. The imaging member of claim 1 wherein said substrate comprises a transparent polymer sheet.

16. The imaging member of claim 1 wherein said substrate comprises a microporous material.

17. The imaging member of claim 1 wherein said image layer is adjacent to at least another layer comprising a microporous material.

18. The imaging member of claim 1 wherein said smectite clay has a (001) spacing of at least 20 Å.

19. The imaging member of claim 1 wherein said smectite clay has a (001) spacing increase of at least 50%.

20. The imaging member of claim 1 wherein said image member comprises an ink-jet recording element.

21. The imaging member of claim 1 wherein the $I_{PEO/IClay}$ ratio is less than 0.3.

22. The imaging member of claim 1 wherein the $I_{PEO}/I_{Clay}$ ratio is less than 0.1.

23. The imaging member of claim 1 wherein said clay particles comprise from 24.5 to 35% by weight of said image layer.

24. A method of forming an image receiving layer comprising providing a synthetic clay, bringing said clay into contact with polyvinyl pyrrolidone to intercalate the clay, bringing said intercalated clay into contact with polyethylene oxide, and coating said composition on a substrate wherein the $I_{peo}/I_{clay}$ ratio is less than 0.6.

* * * * *

UNITED STATES PATENT AND TRADEMARK OFFICE

CERTIFICATE OF CORRECTION

PATENT NO. : 6,680,108 B1 
DATED : January 20, 2004
INVENTOR(S) : Debasis Majumdar et al.

It is certified that error appears in the above-identified patent and that said Letters Patent is hereby corrected as shown below:

Column 16,
Line 3, "less than 60%." change to -- less than 0.6. --
Line 50, "$I_{PEO}/_{IClay}$" change to -- $I_{PEO}/I_{clay}$ --

Signed and Sealed this

Thirtieth Day of March, 2004

JON W. DUDAS
*Acting Director of the United States Patent and Trademark Office*